United States Patent
Okada

(10) Patent No.: US 12,423,640 B2
(45) Date of Patent: Sep. 23, 2025

(54) DELIVERY ITEM INFORMATION MANAGEMENT SYSTEM, METHOD, APPARATUS, AND PROGRAM FOR MANAGING DELIVERY ITEM INFORMATION, AND PRINTING APPARATUS

(71) Applicant: RISO KAGAKU CORPORATION, Tokyo (JP)

(72) Inventor: Yoshiyuki Okada, Tokyo (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 18/613,247

(22) Filed: Mar. 22, 2024

(65) Prior Publication Data

US 2024/0330841 A1 Oct. 3, 2024

(30) Foreign Application Priority Data

Mar. 29, 2023 (JP) .................................. 2023-052964

(51) Int. Cl.
G06Q 10/0832 (2023.01)
G06Q 10/0833 (2023.01)

(52) U.S. Cl.
CPC ..... *G06Q 10/0832* (2013.01); *G06Q 10/0833* (2013.01)

(58) Field of Classification Search
CPC ..................... G06Q 10/0832; G06Q 10/0833
See application file for complete search history.

(56) References Cited

U.S. PATENT DOCUMENTS

| 2014/0330685 A1* | 11/2014 | Nazzari ................ G06Q 10/083 705/28 |
| 2015/0371183 A1* | 12/2015 | Anderson .......... G06Q 10/0833 705/333 |
| 2017/0276507 A1* | 9/2017 | Zacharenko ....... G01C 21/3694 |
| 2021/0035064 A1* | 2/2021 | Nishikawa ............. A61B 5/024 |
| 2024/0378549 A1* | 11/2024 | Suga .................. G06Q 10/0836 |

FOREIGN PATENT DOCUMENTS

JP 7-165310 A 6/1995

OTHER PUBLICATIONS

Shahikian, Setrag "The Role of Shipping Labels in Inventory Management", Finale Inventory, Jul. 5, 2022 (available at https://www.finaleinventory.com/inventory-management/role-of-shipping-labels-in-inventory-management) (Year: 2022).*

* cited by examiner

Primary Examiner — Rupangini Singh
Assistant Examiner — Stephanie S. Wallick
(74) Attorney, Agent, or Firm — GREENBLUM & BERNSTEIN, P.L.C.

(57) ABSTRACT

A delivery information management system includes: a printing apparatus that prints unique identification information related to a delivery item, a memory unit that stores identification information and information related to delivery associated with each other, a plurality of reading units that read the identification information at a plurality of locations during a delivery process, and a control unit that displays information related to delivery when the identification information is read by the reading units at each of the plurality of locations, based on the attributes of a worker who handles the delivery item at each of the plurality of locations.

10 Claims, 10 Drawing Sheets

FIG.3

| UNIQUE ID | INFORMATION RELATED TO DELIVERY ITEM ||||||| INFORMATION RELATED TO DELIVERY DESTINATION ||||
| | WEIGHT | CENTER OF GRAVITY DEVIATION | DIMENSIONS OF THREE SIDES | FRAGILE | NON-INVERTIBLE | NON-STACKABLE | PRECISION EQUIPMENT | ELEVATOR AVAILABILITY | CART AVAILABILITY | EASILY MISTAKEN ENTRANCE | TOPIC |
|---|---|---|---|---|---|---|---|---|---|---|---|
| 1234567 | 2KG | × | 60CM | ○ | × | × | × | × | ○ | × | |
| 1234568 | 10KG | ○ | 100CM | × | ○ | × | × | × | × | × | WATCHDOG PRESENT |
| 1234569 | 20KG | × | 160CM | × | × | ○ | ○ | ○ | × | × | |
| 1234570 | 30KG | ○ | 200CM | ○ | × | × | × | × | × | ○ | WATCHDOG PRESENT |

FIG.4

| ID NUMBER OF WORKER | WEIGHT | MASK INFORMATION RELATED TO DELIVERY ITEM | | | | | |
|---|---|---|---|---|---|---|---|
| | | CENTER OF GRAVITY DEVIATION | DIMENSIONS OF THREE SIDES | FRAGILE | NON-INVERTIBLE | NON-STACKABLE | PRECISION EQUIPMENT |
| 10001 | HIDE | HIDE | HIDE | DISPLAY | HIDE | HIDE | DISPLAY |
| 10002 | 15KG | DISPLAY | 160CM | DISPLAY | DISPLAY | DISPLAY | HIDE |
| 10003 | 25KG | DISPLAY | HIDE | DISPLAY | HIDE | HIDE | HIDE |

FIG.5

| DISPLAY CONTENT | WEIGHT | CENTER OF GRAVITY DEVIATION | DIMENSIONS OF THREE SIDES | FRAGILE | NON-INVERTIBLE | NON-STACKABLE | PRECISION EQUIPMENT |
|---|---|---|---|---|---|---|---|
| | 30KG | O | | O | | | |

FIG. 7

| ID NUMBER OF WORKER | MASK INFORMATION RELATED TO DELIVERY ITEM | | | | | | | MASK INFORMATION RELATED TO DELIVERY DESTINATION | | | |
|---|---|---|---|---|---|---|---|---|---|---|---|
| | WEIGHT | CENTER OF GRAVITY DEVIATION | DIMENSIONS OF THREE SIDES | FRAGILE | NON-INVERTIBLE | NON-STACKABLE | PRECISION EQUIPMENT | ELEVATOR AVAILABILITY | CART AVAILABILITY | EASILY MISTAKEN ENTRANCE | TOPIC |
| 20001 | HIDE | HIDE | HIDE | DISPLAY | HIDE | HIDE | DISPLAY | HIDE | HIDE | DISPLAY | DISPLAY |
| 20002 | HIDE | DISPLAY | 160CM | DISPLAY | HIDE | HIDE | HIDE | HIDE | DISPLAY | HIDE | HIDE |
| 20003 | 15KG | DISPLAY | 101CM | DISPLAY | DISPLAY | DISPLAY | HIDE | DISPLAY | DISPLAY | HIDE | DISPLAY |

FIG.8

| | INFORMATION RELATED TO DELIVERY ITEM | | | | | | INFORMATION RELATED TO DELIVERY DESTINATION | | | |
|---|---|---|---|---|---|---|---|---|---|---|
| | WEIGHT | CENTER OF GRAVITY DEVIATION | DIMENSIONS OF THREE SIDES | FRAGILE | NON-INVERTIBLE | NON-STACKABLE | PRECISION EQUIPMENT | ELEVATOR AVAILABILITY | CART AVAILABILITY | EASILY MISTAKEN ENTRANCE | TOPIC |
| DISPLAY CONTENT | | | | ○ | | | ○ | | | ○ | ○ |

…

DELIVERY ITEM INFORMATION MANAGEMENT SYSTEM, METHOD, APPARATUS, AND PROGRAM FOR MANAGING DELIVERY ITEM INFORMATION, AND PRINTING APPARATUS

CROSS-REFERENCE TO RELATED APPLICATIONS

The present application claims priority under 35 U.S.C. § 119 to Japanese Patent Application No. 2023-052964, filed on Mar. 29, 2023. The above applications are hereby expressly incorporated by reference, in these entireties, into the present application.

BACKGROUND OF THE INVENTION

1. Field of the Invention

The present disclosure relates to a delivery item information management system, a method, an apparatus and a program that manage the display of information related to delivery at each of the plurality of locations during a delivery process of a delivery item, for managing delivery item information, and a printing apparatus.

2. Description of the Related Art

Conventionally, systems that display information related to delivery items to be packed and delivered in advance have been proposed. For example, Japanese Unexamined Patent Publication No. 1995-165310 proposes a system that presents image data of the face of a delivery worker who will deliver a delivery item to a recipient and image data of the appearance of the delivery item to be delivered to a destination. According to the system disclosed in Japanese Unexamined Patent Publication No. 1995-165310, it is possible to improve the accuracy and efficiency of product delivery, and also possible to improve the efficiency of advance setup work at a delivery destination.

SUMMARY OF THE INVENTION

However, the system disclosed in Japanese Unexamined Patent Publication No. 1995-165310 is principally designed to improve the efficiency of confirmation of delivery recipients, and is not that which improves the efficiency of workers who handle delivery items in warehouses where the delivery items are stored, or of delivery workers who deliver delivery items.

In addition, information related to delivery items or delivery destinations is not sufficiently communicated to delivery item handlers or delivery workers who are involved during a delivery process, which sometimes led to a decrease in work efficiency. Conversely, there are cases in which providing excessive warning information regarding delivery items and delivery destinations to delivery item handlers and delivery workers would be extremely bothersome for experienced workers.

The present disclosure has been developed in view of the foregoing circumstances. The present disclosure provides a delivery item information management system that can provide optimal information to a delivery item handler or a delivery worker during a delivery process and improve work efficiency, a method, a program, and an apparatus for managing delivery item information, and a printing apparatus.

A delivery item information management system of the present disclosure is equipped with an identification information assignment unit that assigns a unique identification information to a delivery item, a memory unit that stores the identification information and information related to delivery correlated to each other, a plurality of reading units that read the identification information at a plurality of locations during a delivery process of the delivery item, and a control unit that displays information related to delivery when the identification information is read by the reading units, based on the attributes of a worker who handles the delivery item at each of the plurality of locations.

According to the delivery item information management system of the present disclosure, when the identification information assigned to a delivery item is read at a plurality of locations during a delivery process, information related to delivery is displayed based on the attributes of the workers who handle the delivery item at each of the plurality of locations. This enables the most appropriate information to be provided to the delivery item handlers and delivery workers during the delivery process, thereby improving work efficiency.

BRIEF DESCRIPTION OF THE DRAWINGS

FIG. 3 is a diagram that illustrates an example of a delivery item information management table.

FIG. 4 is a diagram that illustrates an example of a warehouse warning mask.

FIG. 5 is a diagram that illustrates an example of a display target on a warehouse terminal device.

FIG. 7 is a diagram that illustrates an example of a first delivery service provider warning mask.

FIG. 8 is a diagram that illustrates an example of a display target in a first delivery service provider terminal device.

DETAILED DESCRIPTION OF THE EMBODIMENTS

Figure 1:
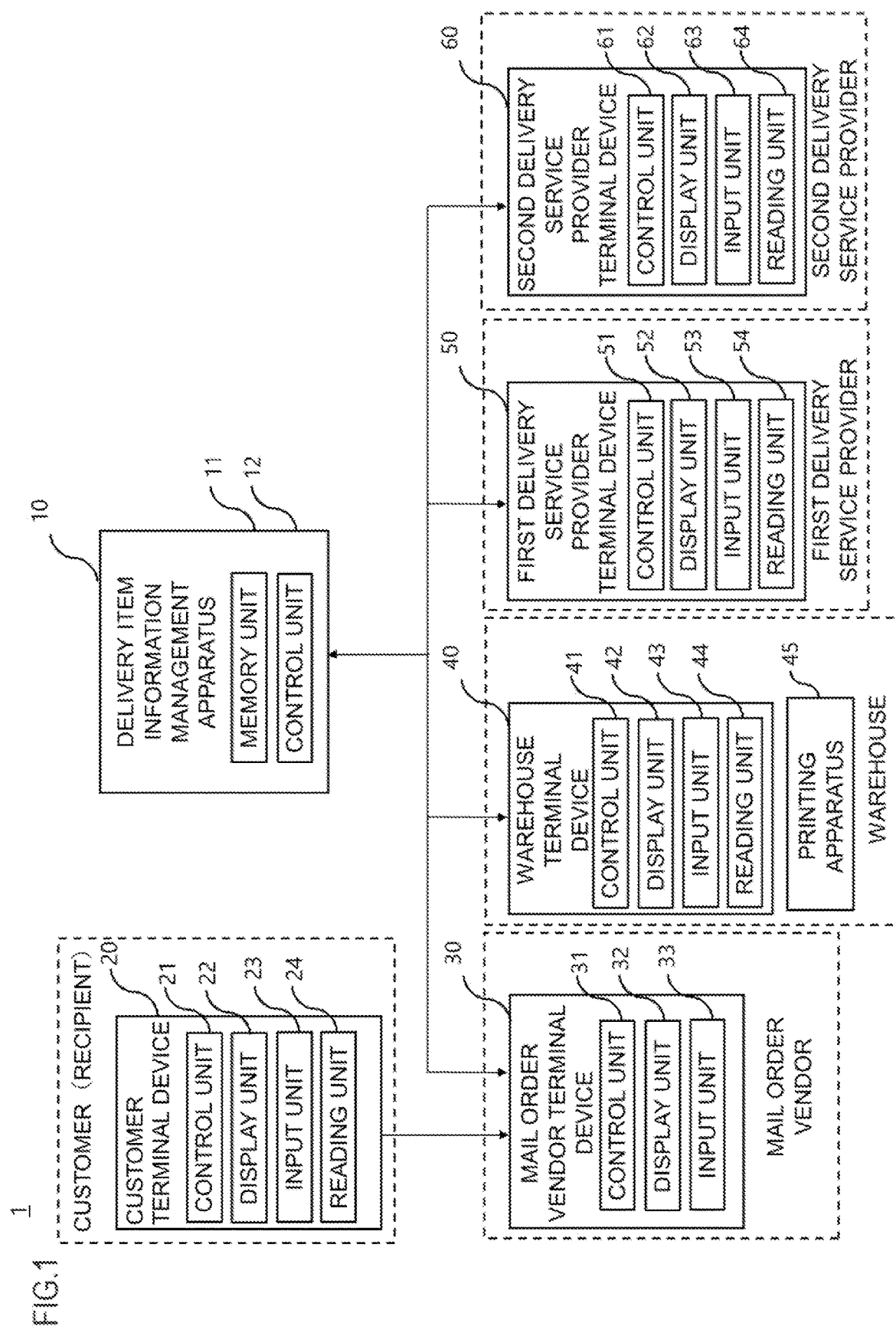
FIG. 1 is a block diagram that illustrates the schematic configuration of an embodiment of a delivery item information management system.

An embodiment of the delivery item information management system 1 will be described in detail below with reference to the attached drawings. FIG. 1 is a block diagram that illustrates the schematic configuration of the delivery item information management system 1.

The delivery item information management system 1 prints unique identification information (hereinafter referred to as "unique ID") on a delivery item that has been packed and sealed with merchandise (contents), and the printed unique ID is read at a plurality of locations during the delivery process of the delivery item. When the unique ID is read at each of the plurality of locations, the system displays information related to delivery based on the attributes of the worker who handles the delivery. As will be explained in detail later, the information related to delivery includes information related to a delivery item and information related to a delivery destination.

Information based on the work which is performed by workers may be employed as the attributes of workers who handle delivery items, for example. For example, information based on the work which is performed by workers such as warehouse workers who work at warehouses before the delivery items are packed and shipped, or delivery workers who deliver the delivery items from the warehouses to the recipient after the delivery items are shipped from the warehouses may be employed.

In addition, information specific to individual workers may be used as an attribute of workers who handle the delivery items. In the present embodiment, identification information of workers, to be described later, is used as the information specific to individual workers.

In the present embodiment, the system specifies the information to be displayed from among the information related to delivery based on the attributes of a worker as described above, and displays the information to the worker.

The information related to delivery includes, for example, the weight, center of gravity deviation, the dimensions of three sides of a package, and other information related to the delivery item, as well as information related to the delivery destination, such as whether an elevator is available at the delivery destination and whether a cart can be used at the delivery destination, which will be described in detail later.

As illustrated in FIG. 1, the delivery item information management system 1 of the present embodiment is equipped with: a delivery item information management apparatus 10; a customer terminal device 20, a mail order vendor terminal device 30; a warehouse terminal device 40; a first delivery service provider terminal device 50; and a second delivery service provider terminal device 60. Note that a premise of the present embodiment is that a customer who places an order and a recipient of an ordered product are the same. Therefore, the customer terminal device 20 is also the terminal device to be utilized by the recipient. If the person placing the order and the recipient of the product are different, a terminal device for a recipient (not shown) may be provided separately from the customer terminal device 20. The terminal device for a recipient performs the same functions as those of the customer terminal device 20 as in the case that the customer is the recipient, which will be described below.

The customer terminal device 20, the mail order vendor terminal device 30, the warehouse terminal device 40, the first delivery service provider terminal device 50, the second delivery service provider terminal device 60, and the delivery item information management apparatus 10 are connected via a communication network such as the Internet, and are configured to exchange various types of information with each other.

In addition, a dedicated application for accessing the delivery item information management apparatus 10 is installed in the mail order vendor terminal device 30, the warehouse terminal device 40, the first delivery service provider terminal device 50, and the second delivery service provider terminal device 60. The mail order vendor, the warehouse, the first delivery service provider, and the second delivery worker register identification information in advance with the delivery item information management apparatus 10 using the above dedicated application. The identification information includes an identification number, a login ID, a login password, and user information (age, gender, physical characteristics (height, weight), etc.). In addition, with respect to the warehouse, the first delivery service provider, and the second delivery worker, identification information is registered for each worker.

The mail order vendor, the warehouse, the first delivery service provider, and the second delivery worker start the above dedicated application and log in by entering their login ID and login password. This enables access to the delivery item information management apparatus 10. Biometric or other methods of authentication may also be utilized in combination for user authentication to log in.

The various functions of the customer terminal device 20, the mail order vendor terminal device 30, the warehouse terminal device 40, the first delivery service provider terminal device 50, and the second delivery service provider terminal device 60 to be described below are performed by the above dedicated applications.

In the present embodiment, the dedicated application which is installed in each of the mail order vendor terminal device 30, the warehouse terminal device 40, the first delivery service provider terminal device 50, and the second delivery service provider terminal device 60 is employed. However, the present disclosure is not limited to such a configuration, and a dedicated application which is provided by the delivery item information management apparatus 10 via a web browser may be utilized.

The following describes the general flow of processes performed the delivery item information management system 1 of the present embodiment. Hereinafter, all or part of the customer terminal device 20, the mail order vendor terminal device 30, the warehouse terminal device 40, the first delivery service provider terminal device 50, and the second delivery provider terminal device 60 for the second delivery worker may simply be referred to as terminal devices.

In the delivery item information management system 1 of the present embodiment, first, a customer places an order for a product using the customer terminal device 20. Upon receiving the order for the product from the customer, the mail order vendor uses the mail order vendor terminal device 30 to access the delivery item information management apparatus 10 and obtains a unique ID.

The unique ID is a control number which is uniquely assigned to each delivery item by a delivery service provider and is set in advance in the delivery item information management apparatus 10. The unique ID itself does not contain personal information of the customer or recipient, but is simply an array of numbers, letters, and symbols, for example. The unique ID is used to manage a delivery item in which a product is packed during the delivery process from the time the product is ordered to the time the product is delivered to the recipient.

Next, the mail order vendor uses the mail order vendor terminal device 30 to input information related to the delivery item described above, such as the weight of the delivery item, whether the center of gravity is deviated, the dimensions of three sides of a package, whether the item is fragile, whether the item is not to be inverted, whether the item is non-stackable, whether the item is precision equipment, etc., and then outputs this information together with the unique ID to the delivery item information management apparatus 10. The information related to the delivery item and the unique ID are correlated and registered. The above information related to the delivery item may be set in advance in the mail order vendor terminal device 30 and automatically obtained based on a product ID and a product name output as order information from the customer terminal device 20.

In addition, the delivery item information management apparatus 10 stores information related to delivery destinations, such as whether an elevator is available, whether a cart can be used, etc. as described above and the addresses of the delivery destinations in a delivery destination information table. Delivery address information is output to the delivery item information management apparatus 10 from the mail order vendor terminal 30 along with the unique ID. The delivery item information management apparatus 10 refers to the delivery address information table based on the delivery address, acquires information related to the delivery destination corresponding to the delivery address, and stores the information correlated with the unique ID.

That is, when order information for a given product is input to the mail order vendor terminal 30, the unique ID of the delivery item and information related to the delivery item (information related to the delivery item and the delivery destination) are correlated and stored as a delivery item information management table at the delivery item information management apparatus 10.

Figure 2:
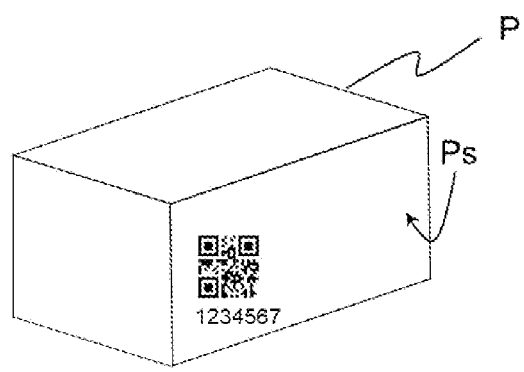
FIG. 2 is a diagram that illustrates an example of a delivery item (cardboard box) with a QR code printed as a unique ID.

Next, a request is sent from the mail order vendor terminal device 30 to the warehouse terminal device 40 to prepare for shipment of the product. At this time, the unique ID is also output from the mail order vendor terminal device 30 to the warehouse terminal device 40. The warehouse then prepares the ordered product and seals it in packaging material such as a cardboard box. Further, the unique ID is printed on the outer surface of the packaging material of the delivery item such as a cardboard box at the warehouse using a printing apparatus 45 provided at the warehouse. The unique ID is printed as a QR code (registered trademark), for example. However, the present disclosure is not limited to such a configuration, and coded information other than a QR code such as a two dimensional bar code may be employed. The QR code or 2D barcode may be generated by the delivery item information management apparatus 10 and output to the printing apparatus 45, or it may be generated at the side of the printing apparatus 45. FIG. 2 illustrates an example of a delivery item with a QR code printed thereon as the unique ID.

Delivery items having unique ID's printed thereon are stored temporarily in the warehouse and then handed over to a delivery service provider.

In the present embodiment, the delivery is delivered to the customer (recipient) via two delivery service providers, a first delivery service provider and a second delivery service provider. However, the present disclosure is not limited to such a configuration. The delivery item may be delivered to the customer (recipient) via only one delivery service provider, or via three or more delivery service providers.

As described above, the delivery item with the unique ID printed on it is delivered to the customer (recipient) via the warehouse, the first delivery service provider, and the second delivery service provider. The unique ID is read by the terminal device at each of the plurality of locations during the delivery process. The unique ID which is read by the terminal devices at each of the plurality of locations is output to the delivery item information management apparatus 10, which outputs and displays information related to the delivery item associated with the unique ID to the terminal devices at each of the plurality of locations. When displaying this information related to delivery, the delivery item information management apparatus 10 specifies the displayed contents according to the attribute information of the worker who has read the unique ID. How the display contents of the information related to delivery are specified will be described in detail later.

The following is a more detailed description of each of the components that constitute the delivery item information management system 1.

The delivery item information management apparatus 10 is equipped with a memory unit 11 and a control unit 12. In the present embodiment, the control unit 12 functions as the control unit and management unit of the present disclosure.

As illustrated in FIG. 3, the memory unit 11 stores a delivery item information management table that associates the unique ID described above with information related to the delivery.

As described above, the information related to the delivery item which is associated with the unique ID includes the weight of the item, whether the center of gravity of the delivery item is likely to deviate, the dimensions of three sides of a package, whether the delivery item is fragile, whether the delivery item is not to be inverted, whether the delivery item is non-stackable, and whether the delivery item is precision equipment. Note that the circular "O" mark illustrated in FIG. 3 means that the information related to the delivery applies to that delivery item. For example, a "O" in the "Center of Gravity Deviation" field means that the delivery item, to which the unique ID is assigned has a tendency to have an unbalanced center of gravity, and a "O" in the "fragile" field means that the delivery to which the unique ID is assigned is fragile. Meanwhile, the "X" mark illustrated in FIG. 3 means that the information related to the delivery does not apply to that delivery item. For example, an "X" mark in the "Center of Gravity Deviation" field means that the delivery item to which the unique ID is assigned is not likely to have an unbalanced center of gravity, and an "X" mark in the "fragile" field means that the delivery item to which the unique ID is assigned is not fragile.

Note that the information related to delivery is not limited to the above examples, but may include other information as well.

Information related to a delivery destination includes whether an elevator is available at the delivery destination, whether a cart can be used at the delivery destination, and whether the entrance to the delivery destination is easily mistaken. If there is any other information related to the delivery destination, it is stored in the "Topic" field. In the example illustrated in FIG. 3, the "Topic" field stores the information "Watchdog Present", but the information which is stored in the "Topic" field is not limited to this, and any other information related to the delivery destination may be stored in the "Topic" field. For example, information such as "The reception entrance changes after 6:00 p.m." or "There is a typhoon forecast", "No unattended delivery", etc. may be stored in the "Topic" field.

The information related to the delivery destination is not limited to the examples illustrated in FIG. 3, but may include other information as well.

The memory unit 11 also stores warning masks (indicating whether the information is to be displayed by the terminal device) which are used to identify information related to the delivery to be displayed by the terminal device when the unique ID of a given delivery is read by the terminal device. FIG. 4 illustrates an example of a warehouse warning mask to identify information related to a delivery item to be displayed by the warehouse terminal device 40.

As illustrated in FIG. 4, the warehouse warning mask stores identification numbers as attribute information for each warehouse and mask information (information indicating the target to be masked) to identify the information related to delivery to be displayed to each worker. The warehouse's warning mask stores only the information related to the delivery as mask information, since workers at the warehouse need only the information related to a delivery item and not information related to a delivery destination.

In the "Weight" field of the mask information, a threshold weight is stored in advance for each worker to determine whether the "weight" information in the information related to the delivery item illustrated in FIG. 3 is displayed by the warehouse terminal device 40. Specifically, "25 kg" is stored in the "Weight" field for a worker whose identification number is "10003", for example, so if the "Weight" of the information related to the delivery item illustrated in FIG. 3 is 25 kg or more, the weight information is displayed by the terminal device 40 of the warehouse worker "10003". That is, for example, if the unique ID "1234570" illustrated in FIG. 3 is read by the warehouse terminal device 40 worker "10003", the information related to the "weight" corresponding to the unique ID "1234570" is displayed as "30 kg".

Meanwhile, if the "Weight" of the information related to the delivery item illustrated in FIG. 3 is less than "25 kg", the weight is not displayed by the warehouse terminal device 40 of worker "10003". That is, for example, if the unique ID "1234567", unique ID "1234568" and unique ID "1234569" illustrated in FIG. 3 are read by the warehouse terminal device 40 of worker "10003", then the unique IDs "1234567", "1234568" and "1234569" are read by the warehouse terminal device 40, the "Weight" information corresponding to the above unique IDs "1234567", "1234568", and "1234569", "2 kg", "10 kg" and "20 kg" will not be displayed.

Note that in the present embodiment, if a threshold weight is not set in the "Weight" field, the mask will be "Hide".

In the "Dimensions of Three Sides" field of the mask information, a threshold size is stored in advance for each worker to determine whether the "Dimensions of Three Sides" information in the information related to the delivery illustrated in FIG. 3 is displayed by the warehouse terminal device 40. Specifically, for example, "160 cm" is stored in the "Dimensions of Three Sides" field for a worker whose identification number is "10002", so if the "Dimensions of Three Sides" of the information related to the delivery illustrated in FIG. 3 is "160 cm" or larger, the 3-sided size information is displayed by the warehouse terminal device 40 of the worker "10002". That is, if the unique IDs "1234569" and "1234570" illustrated in FIG. 3 are read by the warehouse terminal device 40 of the worker "10002", for example, the information of the dimensions of three sides corresponding to the unique IDs "1234569" and "1234570" is displayed as "160 cm" and "200 cm".

On the other hand, if the "Dimensions of Three Sides" of the information related to the delivery illustrated in FIG. 3 is less than "160 cm", information regarding the dimensions of three sides is not displayed by the warehouse terminal device 40 of the worker "10002". That is, for example, if the unique IDs "1234567" and "1234568" illustrated in FIG. 3 are read by the warehouse terminal device 40 of the worker "10002," the "Dimensions of Three Sides" information corresponding to the above unique IDs "1234567", "1234568," and "1234569", which are "60 cm" and "100 cm", is not displayed.

Note that in the present embodiment, if a threshold size is not set in the "Dimensions of Three Sides" field, the mask will be "Hide".

In addition, other mask information, such as "Center of Gravity Deviation", "Fragile", "Non-Invertible", "Non-stackable," and "Precision Equipment" are stored, and "Display" or "Hide" is stored in each of these fields in the warehouse warning mask illustrated in FIG. 4. In the case that "Display" is stored, it means that the information related to the delivery item is to be displayed, and in the case that "Hide" is stored, it means that the information related to the delivery item is not to be displayed.

Specifically, for example, in the case that the unique ID "1234570" is read by the warehouse terminal device 40 for worker "10003", "Display" is stored in the "Center of Gravity Deviation" field of "10003" in the warehouse warning mask. Therefore, "Center of Gravity Deviation: YES" is displayed by the warehouse terminal device 40. In addition, because "Display" is also stored in the "Fragile" field of "10003" in the warehouse warning mask, "Fragile" is displayed by the warehouse terminal device 40.

On the other hand, because "Hide" is stored in the "Dimensions of Three Sides" field of "10003" in the warehouse warning mask, "200 cm," which is the "Dimensions of Three Sides" information corresponding to the unique ID "1234570", is not displayed by the warehouse terminal device 40. In addition, because "Hide" is also stored in the fields of "10003" of the warehouse warning mask for "Non-Invertible", "Non-Stackable", and "Precision Equipment", these items of information will not be displayed by the warehouse terminal device 40.

Figure 6:
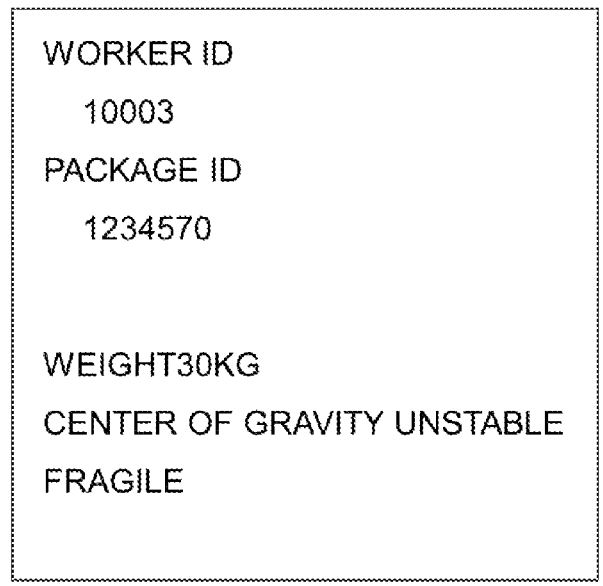
FIG. 6 is a diagram that illustrates an example of a display of a warehouse terminal device.

FIG. 5 illustrates what is displayed by the warehouse terminal device 40 when the unique ID "1234570" is read by the warehouse terminal device 40 by the worker with the identification number "10003". As illustrated in FIG. 5, in the above case, among the information related to the delivery item with the unique ID "1234570" illustrated in FIG. 3, the information related to "Weight", "Center of Gravity Deviation" and "Fragile" are displayed by the warehouse terminal device 40, while the other information related to the delivery is not displayed because the warehouse warning mask stores "Hide". FIG. 6 illustrates an example of the display on the warehouse terminal device 40. As illustrated in FIG. 6, among the information related to the delivery item with the unique ID "1234570" illustrated in FIG. 3, only the information related to "Weight", "Center of Gravity Deviation" and "Fragile" are displayed by the warehouse terminal device 40.

Next, FIG. 7 illustrates an example of a first delivery service provider warning mask for identifying information related to the delivery that is displayed by the first delivery service provider terminal device 50 for the workers of the first delivery service provider.

As illustrated in FIG. 7, the first delivery service provider warning mask stores identification numbers as attribute information for each worker of the first delivery service provider, and mask information for identifying information related to the delivery to be displayed to each worker. Because the workers of the first delivery service provider need information related to the delivery item as well as information related to the delivery destination, the first delivery service provider warning mask stores both information related to the delivery item and information related to the delivery destination as mask information.

The mask information related to delivery items in the first delivery service provider warning mask is the same as the warehouse warning mask described above.

As illustrated in FIG. 7, the mask information related to the delivery address of the first delivery service provider warning mask stores "Elevator Availability", "Cart Availability", "Easily Mistaken Entrance," and "Topic", with "Display" or "Hide" stored in the fields. In the case that "Display" is stored, this means that the information related to the delivery destination is to be displayed, and when "Hide" is stored, it means that the information related to the delivery destination is not to be displayed.

Specifically, for example, if the unique ID "1234570" is read by the first delivery service provider terminal device 50 of a worker "20001", "Display" is stored only for the fields "Fragile", "Precision Equipment", "Easily Mistaken Entrance" and "Topic" in the field "10003" for the first delivery service provider warning mask. Therefore, the first delivery service provider terminal device 50 displays only the information related to "Fragile", "Precision Instrument", "Easily Mistaken Entrance", and "Topic" among the information related to delivery corresponding to the unique ID "1234570" illustrated in FIG. 3.

Figure 9:
FIG. 9 is a diagram that illustrates an example of a display of the first delivery service provider terminal device.

FIG. 8 illustrates the contents which are displayed by the first delivery service provider terminal device 50 in the case that the unique ID "1234570" is read by the first delivery service provider terminal device 50 by the worker with the identification number "20001". In addition, FIG. 9 also illustrates an example of the display of the first delivery service provider terminal device 50. As illustrated in FIG. 9, among the information related to the delivery of the unique ID "1234570" illustrated in FIG. 3, only the information related to "Fragile", "Precision Equipment," "Easily Mistaken Entrance", and "Topic" are displayed by the warehouse terminal device 40.

Note that in the case that the information related to delivery illustrated in FIG. 3 is "X" (not applicable) and the mask information is "Display", nothing is displayed, as illustrated in FIGS. 6 and 9.

In addition, the second delivery service provider warning mask for specifying information related to delivery to be displayed by the second delivery service provider terminal device 60 of a worker of the second delivery service provider is also stored in the memory unit 11. However, this warning mask is similar to the first delivery service warning mask, so illustrations in drawings will be omitted here. The control of displaying information related to delivery using the second delivery service provider warning mask is also similar to that of the first delivery service provider warning mask, so an explanation will be omitted here.

In the present embodiment, each warning mask is generated by associating the worker's identification number with the mask information. However, it is also possible to generate each warning mask by associating user information (age, gender, physical characteristics (height, weight), etc.) included in the worker's identification information with the mask information.

The relationship between the worker's user information and mask information may be set in advance, and the mask information may be automatically generated when the worker's user information is acquired. The mask information may also be estimated and automatically set by inputting the user information of the worker to a learned model obtained by machine learning the relationship between the worker's user information and the mask information.

The control unit 12 manages the information related to delivery stored in the memory unit 11. Specifically, the control unit 12 receives information of the unique ID printed on the delivery item which is read out at the warehouse, the first delivery service provider, and the second delivery service provider. Then, based on the received unique ID, the information related to the delivery item corresponding to the unique ID is identified by referring to the delivery item information management table stored in the memory unit 11.

The control unit 12 then identifies and displays information related to the delivery to be displayed by the terminal device at each of the plurality of locations based on the identification number of the worker whose unique ID was read, the warehouse warning mask, the first delivery service provider warning mask, and the second delivery service provider warning mask.

The contents of the warehouse warning mask, the first delivery service provider warning mask, and the second delivery service provider warning mask described above may be modified.

For example, a person in charge at a site may decide and set the terminal device to display all the information related to delivery illustrated in FIG. 3 when a worker is new, or the worker himself/herself may change the information from "Display" to "Hide" when he/she becomes familiar with the work. If the "Center of Gravity Deviation" information is not required to be displayed (warned), it may be changed from "Display" to "Hide" from a terminal device of the person in charge or a terminal device of each worker, for example.

For example, the workers of the second delivery service provider may answer a questionnaire regarding a delivery destination after delivery of a delivery item, and the information related to the delivery destination may be changed to reflect the answers to the questionnaire. For example, information such as "From August 1, deliveries are only to the back door" may be added to the field "Topic", which is information related to the delivery destination.

After the customer (recipient) receives a delivery item, he/she may use the customer terminal device 20 to read the unique ID of the delivery to display a questionnaire screen regarding the state of the delivery item upon arrival, and the answers to the questionnaire may be reflected in the information regarding the delivery.

For example, if a customer (the recipient) responds that the item "Non-Invertible" was not observed, managers of the first and second delivery service providers may confirm this response and change the "Non-Invertible" field on the first and second delivery service provider warning masks for the worker who delivered that delivery from "Hide" to "Display".

If, as a result of analyzing delivery error information in the responses to the questionnaire filled out by the customer (recipient), there is a trend of workers whose responses include delivery error information (such as responses to the effect that the aforementioned item "Non-Invertible" was not observed, that there were signs that delivery items were stacked, etc.), the field corresponding to the delivery error information in the first or second delivery service provider warning mask of the worker who fits that trend may be changed from "Hide" to "Display".

For example, if delivery error information to the effect that the "Non-Invertible" was not observed is mostly for male workers over 50 years old, the "Non-Invertible" field on the first or second delivery service provider warning mask for all applicable workers may be changed from "Hide" to "Display". Alternatively, this field may be changed from "Hide" to "Display" for men and women 55 years of age or older.

For example, a learned model may be generated by machine learning the relationship between delivery error information and user information such as worker age, gender, and physical characteristics (height and weight) in advance, and delivery error information may be estimated by inputting the worker's user information into the learned model. The information in the first or second delivery service provider warning mask corresponding to the delivery error information may then be automatically changed from "Hide" to "Display".

If, even after information in the first or second delivery service provider warning mask is changed based on the delivery error information as described above, similar delivery error information continues for the same worker, information related to delivery corresponding to that delivery error information (e.g., the item "Non-Invertible" were not observed), "Non-Invertible" may be displayed in greater detail or in an emphasized manner, such as in a different color or as a blinking display.

If similar delivery error information continues for the same worker, the delivery item to which the information related to delivery corresponding to the delivery error information (e.g., "Non-Invertible") is added may not be delivered by the worker. That is, the user information of workers who are allowed to deliver the delivery may be identified for the information related to delivery corresponding to the delivery error information, and the delivery may be performed by workers to which such user information is associated.

The delivery item information management apparatus 10 is equipped with a CPU (Central Processing Unit), a semiconductor memory such as ROM (Read Only Memory) and RAM (Random Access Memory), storage such as a hard disk, a communication I/F (Interface), etc.

An embodiment of the delivery item information management program of the present disclosure is installed in the storage of the delivery item information management apparatus 10. When this delivery item information management program is booted up by the CPU, the functions of the delivery item information management apparatus 10 described above are executed.

In the present embodiment, the functions described above are performed by the CPU executing the delivery item information management program, but some or all of the functions performed by the delivery item information management program may be performed by hardware such as an ASIC (Application Specific Integrated Circuit), a FPGA (Field-Programmable Gate Array), or other electrical circuits.

Next, the customer terminal device 20 will be described.

The customer terminal device 20 is used by a person who orders a product as described above, and may be a desktop or laptop PC, for example, but it may also be a mobile device such as a tablet terminal or smartphone.

The customer terminal device 20 is equipped with a control unit 21, a display unit 22, an input unit 23, and a reading unit 24. The control unit 21 controls the customer terminal device 20 as a whole. In particular, the control unit 21 displays a product order screen on the display unit 22 and receives setting inputs such as product information, ordering party information, recipient information, and instructions for delivery (delivery conditions) on the product order screen. The control unit 21 outputs the various information entered on the product order screen as necessary.

The display unit 22 is equipped with a liquid crystal display or the like, and displays the product order screen. The input unit 23 is equipped with input apparatuses such as a keyboard and a mouse, and is configured to receive setting input of various information related to the product order screen, as well as responses to the aforementioned questionnaire regarding the state of a delivery item upon arrival. In the case that the customer terminal device 20 is a tablet terminal or a smartphone, the touch panel of the tablet terminal or smartphone corresponds to the display unit 22 and the input unit 23.

The reading unit 24 reads the unique ID (QR code) printed on the outer surface of a packaging received by a recipient (a person who placed an order).

The unique ID read by the reading unit 24 is output to the delivery item information management apparatus 10. The control unit 12 of the delivery item information management apparatus 10 outputs a questionnaire to the customer terminal device 20 regarding the state of a delivery item corresponding to the unique ID upon arrival, based on the input unique ID. The responses to the questionnaire by the customer are then output from the customer terminal device 20 to the delivery item information management apparatus 10.

When the delivery item information management apparatus 10 receives a questionnaire response, it identifies the identification number of the worker who delivered the delivery with the unique ID corresponding to the questionnaire, and outputs the worker's identification information to the first delivery service provider terminal device 50 or the second delivery service provider terminal device 60 such that the first delivery service provider or the second delivery service provider can confirm the worker's identification.

Next, the mail order vendor terminal device 30 will be described.

The mail order vendor terminal device 30 is used by mail order vendors as described above, and is, for example, a desktop or laptop PC, but it may also be a mobile device such as a tablet terminal or a smartphone.

The mail order vendor terminal device 30 is equipped with a control unit 31, a display unit 32, and an input unit 33. The control unit 31 controls the entire mail order vendor terminal device 30 as a whole. In particular, the control unit 31 accesses the delivery item information management apparatus 10 and obtains a unique ID in response to order information output from the customer terminal device 20.

The control unit 31 is configured to receive input of information related to a delivery item, such as "Weight" and "Center of Gravity Deviation" information of the delivery item as described above, and outputs these items of information together with the unique ID to the delivery item information management unit 10 for storage in the delivery item information management table.

The display unit 32 is equipped with a liquid crystal display or the like, and displays the various items of the input information described above. The input unit 33 is equipped with an input apparatus such as a mouse or keyboard and is configured to receive input of information related to the delivery items described above. When the mail order vendor terminal device 30 is a tablet terminal or a smartphone, the touch panel of the tablet terminal or smartphone corresponds to the display unit 32 and the input unit 33.

Next, the warehouse terminal device 40 will be described.

The warehouse terminal device 40 is used by warehouses as described above, and may be, for example, a desktop or laptop PCs, but may also be a mobile device such as a tablets terminal, a smartphone, and a handy terminal.

The warehouse terminal device 40 is equipped with a control unit 41, a display unit 42, an input unit 43, and a reading unit 44. The control unit 41 controls the warehouse terminal device 40 as a whole. In particular, the control unit 41 outputs the unique ID printed on a delivery item to the delivery item information management apparatus 10 when the unique ID is read by the reading unit 44.

The control unit 12 of the delivery item information management apparatus 10 refers to the delivery item information management table illustrated in FIG. 3 based on a unique ID which is entered, and outputs the information related to delivery associated with the unique ID to the warehouse terminal device 40. At this time, the control unit 12 identifies the information related to delivery to be output to the warehouse terminal device 40 using the warehouse warning mask illustrated in FIG. 4. The information related to delivery which is output from the delivery item information management apparatus 10 is displayed by the display unit 42.

The display unit 42 is equipped with a liquid crystal display or the like, and displays information related to deliveries output from delivery item information management apparatus 10. The input unit 43 is equipped with input apparatuses such as a keyboard and mouse, and is configured to receive setting input of various types of information.

In the case that the warehouse terminal device 40 is a tablet terminal or a smartphone, the touch panel of the tablet terminal or smartphone corresponds to the display unit 42 and the input section 43.

The reading unit 44 reads the unique ID (QR code) printed on the outer surface of the delivery item received by the warehouse, as described above.

Figure 10:
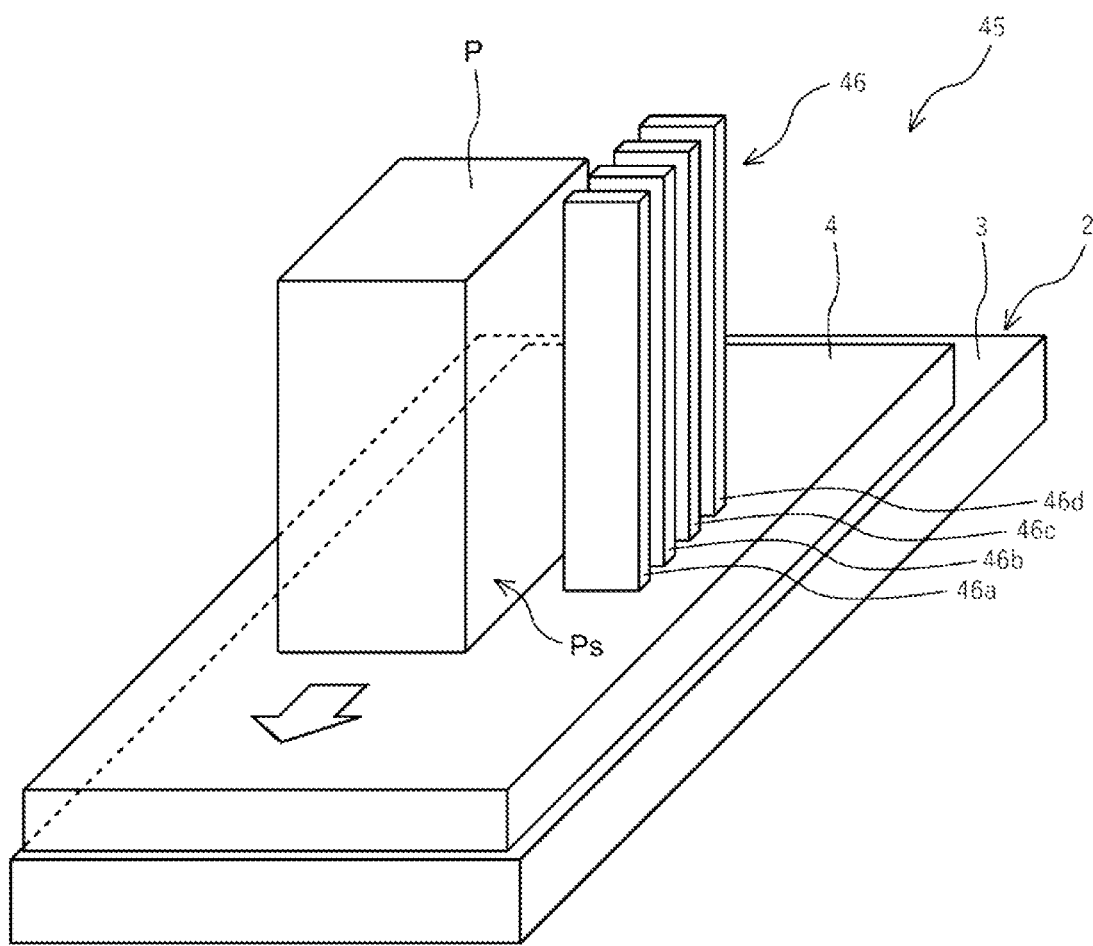
FIG. 10 is a diagram that illustrates an example of an inkjet printing apparatus.

The warehouse is also provided with a printing apparatus 45 for printing the unique ID on packaging for delivery items. The printing apparatus 45 prints the unique ID which is output from the delivery item information management apparatus 10 on the outer surface of the packaging of the delivery item. Inkjet and thermal printing methods can be employed as the printing method. FIG. 10 illustrates an example of the printing apparatus 45, which employs the inkjet method. The printing apparatus 45 illustrated in FIG. 10 is equipped with a head unit 46 and a conveyance unit 2.

The conveyance unit 2 conveys a print medium P in the direction of the arrow illustrated in FIG. 10. The print medium P is, for example, packaging (a cardboard box, for example) with a print surface Ps that stands perpendicular to a conveyance surface, as illustrated in FIG. 10.

The conveyance unit 2 is equipped with a support base 3 and a conveyor belt unit 4. The support base 3 is a base that supports the conveyor belt unit 4.

The conveyor belt unit 4 is equipped with two platen rollers, a conveyor belt, etc. that extend in a direction perpendicular to a conveyance direction of the print medium P. The two platen rollers are arranged in parallel, separated from each other in the conveyance direction of the print medium P. An annular circular conveyor belt is suspended between the two parallel platen rollers, and the platen rollers rotate to move the conveyor belt, thereby conveying the print medium P.

The head unit 46 administers printing by ejecting ink onto the print surface Ps of the print medium P which is conveyed by the conveyance unit 2.

The head unit 46 has four line heads 46*a*, 46*b*, 46*c*, and 46*d*, as illustrated in FIG. 10. The four line heads 46*a* through 46*d* are those in which a plurality of inkjet heads are arranged vertically and parallel with respect to the conveyance direction of the print medium P.

The four line heads 46*a* through 46*d* eject C (cyan), M (magenta), Y (yellow), and K (black) inks, respectively.

As the print medium P is conveyed by the conveyance unit 2, ink is sequentially ejected in the horizontal direction from each of the line heads 46*a* through 46*d*, and printing is administered thereby.

In the case that the unique ID is printed directly on the packaging of the delivery item as in the present embodiment, the label will not be peeled off after unattended delivery, for example. Such a configuration also eliminates the need to separate labels for recycling. In addition, since the printed unique ID does not contain personal information, confidentiality is ensured at the time of disposal.

Next, the first delivery service provider terminal device 50 will be described.

The first delivery service provider terminal device 50 is used by the first delivery service provider as described above, and is, for example, a desktop or laptop PC, but it may also be a mobile device such as a tablet terminal, a smartphone, and a handy terminal.

The first delivery service provider terminal device 50 is equipped with a control unit 51, a display unit 52, an input unit 53, and a reading unit 54. The control unit 51 controls the first delivery service provider terminal device 50 as a whole. In particular, the control unit 51 outputs a unique ID printed on the delivery item to the delivery item information management apparatus 10 when the unique ID is read by the reading unit 54.

The control unit 12 of the delivery item information management apparatus 10 refers to the delivery item information management table illustrated in FIG. 3 based on the input unique ID, and outputs the information related to delivery associated with the unique ID to the first delivery service provider terminal device 50. At this time, the control unit 12 uses the first delivery service provider warning mask illustrated in FIG. 7. The information related to delivery which is output from the delivery item information management apparatus 10 is displayed by the display unit 52.

The display unit 52 is equipped with a liquid crystal display or the like, and displays information related to delivery which is output from the delivery item information management apparatus 10. The input unit 53 is equipped with input apparatuses such as a keyboard and mouse, and is configured to receive setting input of various types of information.

In the case that the first delivery service provider terminal device 50 is a tablet terminal or a smartphone, the touch panel of the tablet terminal or smartphone corresponds to the display unit 52 and the input unit 53.

The reading unit 54 reads the unique ID (QR code) printed on the outer surface of the delivery item received by the first delivery service provider, as described above.

Next, the second delivery service provider terminal device 60 will be described.

The second delivery service provider terminal device 60 is used by the second delivery service provider as described above, and may be a desktop or laptop PC, for example, but it may also be a mobile device such as a tablet terminal, a smartphone, and a handy terminal.

The second delivery service provider terminal device 60 is equipped with a control unit 61, a display unit 62, an input unit 63, and a reading unit 64. The configuration and operation of the second delivery service provider terminal device 60 is the same as that of the first delivery service provider terminal device 50, so a detailed description thereof will be omitted.

In addition, in the above embodiment, the unique IDs of delivery items are read by the reading units 44, 54, and 64 of the warehouse terminal device 40, the first delivery service provider terminal device 50, and the second delivery service provider terminal device 60. However, the present disclosure is not limited to such a configuration, and the unique IDs of delivery items may be read by a by another camera, such as a surveillance camera, for example, and the read out information may be output to the warehouse terminal device 40, the first delivery service provider terminal device 50, and the second delivery service provider terminal device 60.

Alternatively, images of a delivery item and a worker who is handling the delivery item may be captured by a surveillance camera or the like, the warehouse terminal device 40, the first delivery service provider terminal device 50, and the second delivery service provider terminal device 60 may recognize the unique ID of the delivery item based on the captured image, identify the worker by performing authentication using an image of the worker which is stored in advance, and then the unique ID and identification information of the worker may be output to the delivery item information management apparatus 10.

According to the delivery item information management system 1 of the above embodiment, when identification information assigned to a delivery item is read at a plurality of locations during a delivery process, information related to the delivery is displayed based on the attributes of the worker who handles the delivery item at each of the plurality of locations. This enables the best information to be provided to the workers and delivery workers who handle the delivery item during the delivery process, thereby improving work efficiency.

In addition, in the delivery item information management system 1 of the above embodiment, information related to the content of work performed by a worker or information unique to the worker (identification information) is used as an attribute of the worker who handles the delivery item, such that more optimal information can be provided to the worker.

Further, because the delivery item information management system 1 of the above embodiment employs mask information to specify the display of information related to delivery for each worker, it is possible to provide optimal information to each worker by a simple method.

Still further, in the delivery item information management system 1 of the above embodiment, it is possible to change the mask information of a worker according to the instruction information from the worker, such that the mask information can be optimized according to the worker's wishes.

Still yet further, in the delivery item information management system 1 of the above embodiment, the mask information of a worker can be changed based on information related to the worker from the recipient of the delivery item, such that the mask information can be changed to the most appropriate mask information for the worker based on objective information.

The present disclosure is not limited to the above embodiment, but can be embodied by modifying the components thereof to an extent that does not depart from the spirit thereof at the implementation stage. Also, various configurations can be formed by appropriate combinations of the plurality of components disclosed in the above embodiment. For example, all of the components shown in the embodiments may be combined as appropriate. It is, of course, possible to make various modifications and applications within a scope that does not depart from the purpose of the disclosure.

The following additional items are further disclosed with respect to the present disclosure.

Item 1

A delivery item information management system of the present disclosure is equipped with an identification information assignment unit that assigns a unique identification information to a delivery item, a memory unit that stores the identification information and information related to delivery correlated to each other, a plurality of reading units that read the identification information at a plurality of locations during a delivery process of the delivery item, and a control unit that displays information related to delivery when the identification information is read by the reading units, based on the attributes of a worker who handles the delivery item at each of the plurality of locations.

Item 2

In the delivery item information management system of Item 1, the attributes of a worker who handles a delivery item may be information related to the contents of the work of the worker or information specific to the worker.

Item 3

In the delivery item information management system of Item 1, the control unit may have mask information for specifying the display of information related to delivery for each worker.

Item 4

In the delivery item information management system of Item 3, the control unit may change the mask information of a worker according to instruction information from the worker.

Item 5

In the delivery item information management system of Item 3, the control unit may change the mask information of a worker based on information related to the worker from a recipient of the delivery item.

Item 6

A delivery item information management apparatus of the present disclosure is equipped with a memory unit that stores unique identification information assigned to a delivery item and information related to delivery correlated to each other, and a control unit that, when the identification information is read at a plurality of locations during a delivery process of the delivery item, reads from the memory unit the information related to delivery associated with the identification information based on attributes of workers who handle the delivery item at each of the plurality of locations and outputs the information related to delivery correlated with the identification information.

Item 7

A printing apparatus of the present disclosure constitutes the identification information assignment unit of the delivery item information management system of any of Items 1 to 5, and prints identification information onto a delivery item.

Item 8

A delivery item information management method of the present disclosure assigns unique identification information to a delivery item to be delivered, correlates the identification information with information related to delivery, stores the identification information and information related to delivery, and when the identification information is read at a plurality of locations during a delivery process of the delivery item, displays the information related to delivery based on attributes of workers who handle the delivery item at each of the plurality of locations.

Item 9

A delivery item information management program of the present disclosure causes a computer to execute the steps of: storing a unique identification information assigned to a delivery item associated with information related to delivery; and when the identification information is read at each of a plurality of locations during a delivery process of the delivery item, reading the information related to delivery associated with the identification information based on attributes of a worker who handles the delivery item at each of the plurality of locations and outputting the information related to delivery associated with the identification information.

Item 10

A delivery item information management apparatus of the present disclosure is equipped with a management unit that manages information related to delivery of a delivery item, and a control unit that displays information related to delivery associated with identification information of the delivery item when the identification information of the delivery item is read at a plurality of locations during a delivery process of the delivery item based on attributes of workers who handle the delivery item at each of a plurality of locations.

What is claimed is:

1. A printer system comprising:
a processor;
a memory, connected to the processor;
a conveyor belt configured to support and convey a packaging for packaging a delivery item, standing perpendicular to a conveyance surface of the conveyor belt; and
a plurality of vertically-extending print heads spaced apart in a direction parallel to a conveyance direction of the conveyor belt, wherein
the processor is configured to assign unique identification information to the delivery item,
the processor is further configured to instruct the conveyor belt to convey the packaging of the delivery item to the plurality of vertically-extending print heads while the packaging stands perpendicular to the conveyance surface of the conveyor belt of the printer,
the memory is configured to store, in a manner correlated with each other: a) the unique identification information for the delivery item, b) information related to delivery of the delivery item including delivery-item characteristics of the delivery item, and c) a delivery-worker attribute about each delivery worker who handles the delivery item, the delivery-worker attribute including an identification number, age, gender, or physical characteristics of each delivery worker,
the processor is further configured to instruct the print heads to print the unique identification information directly on the print surface of the packaging in a form of a QR code or a barcode, thereby eliminating the need for attaching print labels to the packaging and for separating the print labels from the packaging during recycling, and
the processor is further configured to control a display of a terminal of each delivery worker handling delivery of the delivery item to display one or more of the stored delivery-item characteristics, in response to reading the QR code or the barcode with the unique identification information printed on the packaging with the printer by a corresponding QR code or barcode reader,
and based on the delivery-worker attribute of each delivery worker who handles the delivery item, to display different combinations of the delivery-item characteristics on the terminals of different delivery workers having attributes.

2. The printer system as defined in claim 1, wherein the delivery-worker attribute of each delivery worker also includes information related to work performed by each delivery worker or information specific to each delivery worker.

3. The printer system as defined in claim 1, wherein the memory stores the delivery-worker attribute and the stored delivery-item characteristics of the delivery item as mask information specifying the delivery-item characteristics to be displayed by the terminal of each delivery worker.

4. The printer system as defined in claim 3, wherein the processor changes the mask information for each delivery worker in response to instruction information inputted into the processor from each delivery the worker.

5. The printer system as defined in claim 3, wherein the processor changes the mask information for each delivery worker in response to receipt of information related to the delivery worker from a recipient of the delivery item.

6. A printer system comprising:
a processor;
a memory, connected to the processor and configured to store delivery-item characteristics of information related to delivery of a delivery item and unique identification information assigned to the delivery item;
a conveyor belt controlled by the processor and configured to support and convey a packaging for packaging the delivery item, standing perpendicular to a conveyance surface of the conveyor belt; and
a plurality of vertically-extending print heads spaced apart in a direction parallel to a conveyance direction of the conveyor belt, wherein
the processor is configured to
instruct the conveyor belt to convey the packaging of the delivery item to the plurality of vertically-extending print heads while the packaging stands perpendicular to the conveyance surface of the conveyor belt of the printer,
instruct the print heads to print the stored unique identification information assigned to the delivery item directly on the print surface of the packaging of the delivery item in a form of a QR code or a barcode while the conveyor belt moves the packaging of the delivery item in the conveyance direction, thereby eliminating the need for attaching print labels to the packaging and for separating the print labels from the packaging during recycling,
control scanning of the QR code or the barcode printed on the packaging with an optical QR code or barcode reader at a plurality of locations at which the packaging of the delivery item is handled by different delivery workers, and control a terminal of each delivery worker handling delivery of the delivery item to display one or more of the stored delivery-item characteristics of information related to delivery of the delivery item, in response to scanning the QR code or the barcode by an optical QR code or barcode reader of that delivery worker, and based on a delivery-worker attribute of that delivery worker, to display different combinations of the delivery-item characteristics on the terminals of different delivery workers having attributes, the delivery-worker attribute including an identification number, age, gender, or physical characteristics of a delivery worker.

7. A printer system comprising:
a processor;
a memory, connected to the processor and configured to store delivery-item characteristics of information related to delivery of a delivery item and unique identification information assigned to the delivery item;
a support base;
two rotatable platens supported by the support base;
a conveyor belt suspended between and moved by rotation of the two rotatable platens, controlled by the processor, and configured to support and convey a packaging for packaging the delivery item, standing perpendicular to a conveyance surface of the conveyor belt; and
a plurality of vertically-extending print heads spaced apart in a direction parallel to a conveyance direction of the conveyor belt, wherein
the processor is configured to
instruct the conveyor belt to convey the packaging of the delivery item to the plurality of vertically-extending print heads while the packaging stands perpendicular to the conveyance surface of the conveyor belt of the printer,
instruct the print heads to print the unique identification information assigned to the delivery item directly on the print surface of the packaging of the delivery item in a form of a QR code or a barcode while the conveyor belt moves the packaging of the delivery item in the conveying direction, thereby eliminating the need for attaching print labels to the packaging and for separating the print labels from the packaging during recycling,
control scanning of the QR code or the barcode printed on the packaging with an optical QR code or barcode reader at a plurality of locations at which the packaging of the delivery item is handled by different delivery workers, and
control a terminal of each delivery worker handling delivery of the delivery item to display one or more of the stored delivery-item characteristics of information related to delivery of the delivery item, in response to scanning the QR code or the barcode by an optical QR code or barcode reader of that delivery worker, and based on a delivery-worker attribute of that delivery worker, to display different combinations of the delivery-item characteristics on a display of terminals of different delivery workers having attributes, wherein the delivery-worker attribute includes an identification number, age, gender, or physical characteristics of a delivery worker, the stored delivery-item characteristics include the delivery item's weight, dimensions, fragility, stackability, and ability to be inverted, and whether the delivery item is precision equipment, the processor is configured to control the display of the terminal of each delivery worker handling delivery of the delivery item to display the delivery item's weight, dimensions, fragility, stackability, ability to be inverted, or whether the delivery item is precision equipment, and the display of the delivery item's weight, dimensions, fragility, stackability, ability to be inverted, or whether the delivery item is precision equipment, on a specific delivery worker's terminal, is based on the identification number, age, gender, or physical characteristics of the specific delivery worker who handles the delivery item, so that the processor, the optical QR or barcode readers, and the terminals collectively increase the likelihood of maintaining the delivery item's integrity during the delivery by matching displayed information about the delivery item with an attribute of the worker.

8. The printer system as defined in claim 1, wherein the stored delivery-item characteristics to be displayed on the terminals of the delivery workers further include
whether the center of gravity of the delivery item is likely to be unbalanced, and
the dimensions of three sides of the packaging.

9. The printer system as defined in claim 6, wherein the stored delivery-item characteristics to be displayed on the terminals of the delivery workers further include
whether the center of gravity of the delivery item is likely to be unbalanced, and
the dimensions of three sides of the packaging.

10. The printer system as defined in claim 1,
wherein the information related to delivery also includes information related to characteristics of a delivery destination of the delivery item including information on
whether an elevator is available at the delivery destination,
whether a cart can be used at the delivery destination, and
whether the entrance to the delivery destination is easily mistaken, and
wherein the processor is configured to control the display of the terminal of each delivery worker handling delivery of the delivery item to display one or more of the stored delivery-item characteristics and the stored delivery-destination characteristics, in response to reading the QR code or the barcode with the unique identification information by a corresponding QR code or barcode reader, based on the delivery-worker attribute of each delivery worker who handles the delivery item, and to display different combinations of the delivery-item characteristics and the delivery-destination characteristics on the terminals of different delivery workers having attributes.

* * * * *